United States Patent [19]
Chabraya

[11] Patent Number: 5,689,411
[45] Date of Patent: Nov. 18, 1997

[54] PROPORTIONAL DC POWER CONTROL SYSTEM AND METHOD

[76] Inventor: Kenneth Michael Chabraya, 732 Omega Ct., San Jose, Calif. 95127

[21] Appl. No.: 761,393

[22] Filed: Dec. 6, 1996

Related U.S. Application Data

[62] Division of Ser. No. 254,058, Jun. 3, 1994.

[51] Int. Cl.$^6$ .............................. G01R 31/26; H02M 7/12
[52] U.S. Cl. .............................. 363/74; 219/507; 219/520; 219/538
[58] Field of Search .............................. 323/205, 207, 323/212, 217, 234, 237, 265, 355, 359; 363/13, 74, 78, 123, 125, 128, 129, 130; 318/440, 441, 442, 471; 219/200, 209, 221, 482, 488, 490, 494, 497, 507, 509, 510, 511, 512, 520, 538

[56] References Cited

U.S. PATENT DOCUMENTS

| | | |
|---|---|---|
| 3,890,556 | 6/1975 | Melling et al. . |
| 3,944,909 | 3/1976 | Reymond . |
| 3,979,671 | 9/1976 | Meeker et al. . |
| 4,046,991 | 9/1977 | Sefton et al. . |
| 5,001,423 | 3/1991 | Abrami et al. . |

*Primary Examiner*—Bentsu Ro

[57] ABSTRACT

A control circuit is disclosed which uses AC power input and provides DC power output which is not limited by DC semiconductor switch power dissipation capabilities. Switching is performed on the AC signal to provide time proportional AC power which is then transformed and rectified to provide relatively high proportional or adjustable power to a DC load without electrical noise. The DC load is monitored for a controlled characteristic, such as temperature, and a monitor signal is provided to a control for controlling the time proportional AC power output, in accordance with the DC load demand. A dimensionally stable temperature controlled semiconductor test chuck is described presenting a DC heater load for the control circuit.

13 Claims, 3 Drawing Sheets

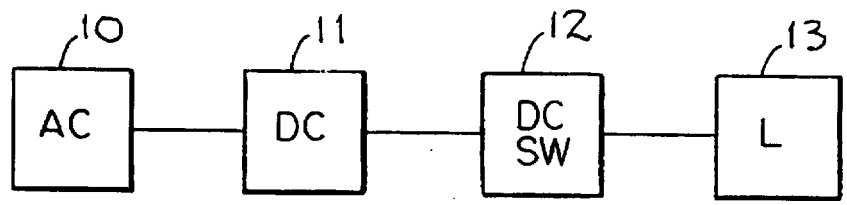
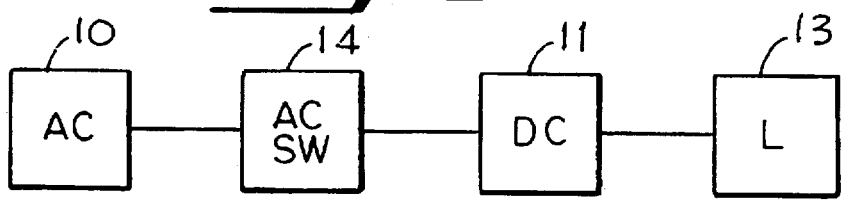
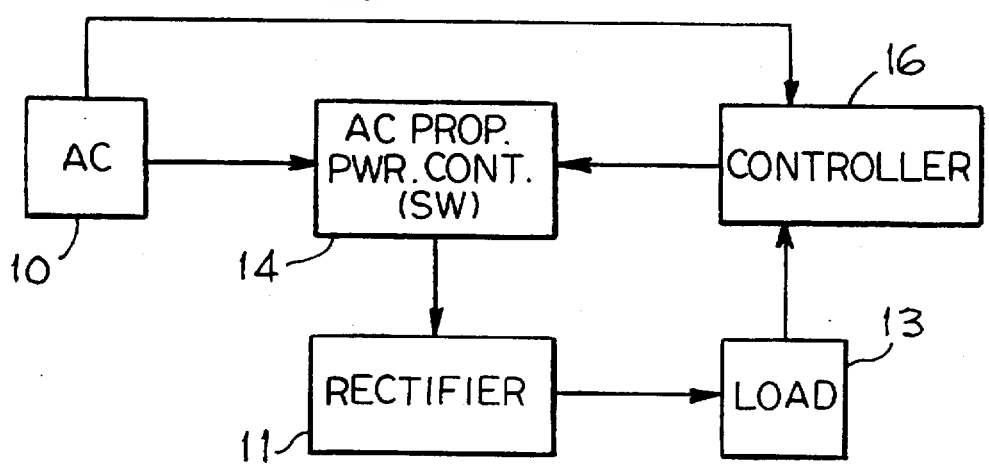

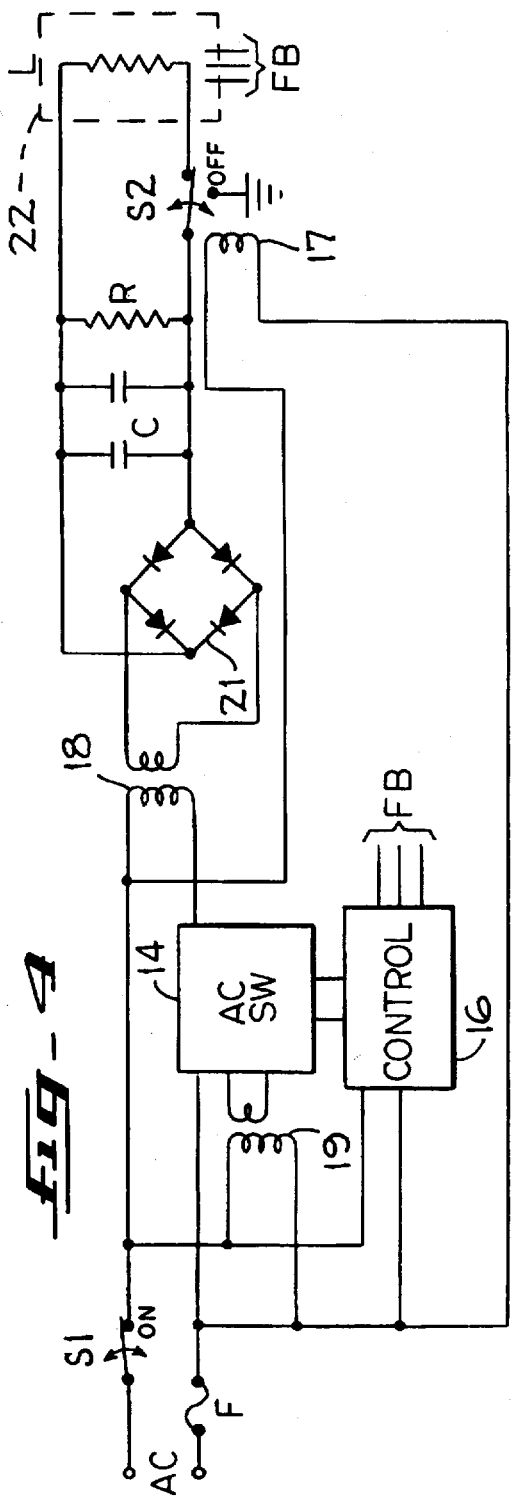
_fig_4_
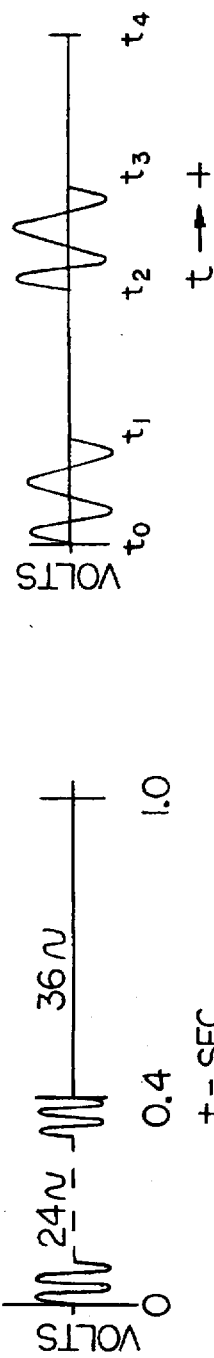
_fig_6_
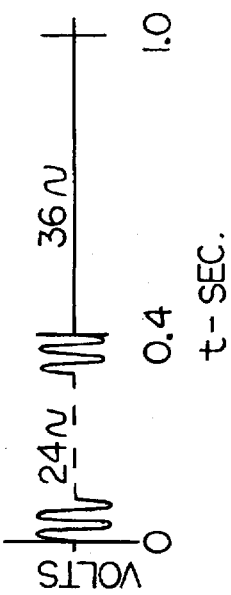
_fig_5_
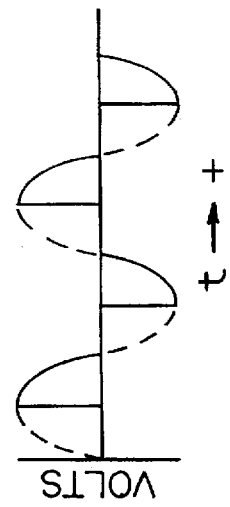
_fig_7_

PROPORTIONAL DC POWER CONTROL SYSTEM AND METHOD

This is a divisional of application Ser. No. 08/254,058, filed on Jun. 3, 1994.

BACKGROUND OF THE INVENTION

Field of the Invention

The invention disclosed herein relates to a proportional power control system. Specifically, this invention relates to a proportional power control system for supplying a high power demand DC load.

In the past high power proportional power control systems were available in the AC power area. However, high power switching which occurs in such AC circuits causes high levels of radiated noise. In addition the continuous power switching causes serious degradation in the life of a load to which the switched power is transmitted. In the DC power area, levels of power which may be switched are limited by the power dissipation capabilities of the switching semiconductor devices. For example, the DC power supplies which switch direct current to provide controlled power to a DC load are limited at present to about 42 volts DC at 7 amperes without creating a level of solid state relay generated switching noise in the line which is not acceptable in this application. This is less than 300 watts of DC power which is insufficient to supply a number of DC load applications. A type of high load power supply system where variac controlled AC is rectified in an open loop system. There is, therefore, a need for a DC power supply which will provide adjustable DC power in either high current or high voltage demand situations.

SUMMARY OF THE INVENTION

In one aspect of the invention apparatus is provided for supplying power from an AC source to a DC load wherein the load requires power on demand to maintain a predetermined load characteristic. AC switching means is connected to the AC source and provides a time proportional AC power output. Rectifying means is connected to receive the time proportional AC power output and to provide a DC power output proportional to the AC power output. The DC power output is connected to the load and controller means is connected to sense the predetermined load characteristic and to provide a controller output indicative thereof. The controller output is connected to the AC switching means to adjust the time proportional AC power output to obtain the predetermined DC load characteristic.

In another aspect of the invention a control system is provided for a high DC power consuming device having a predetermined characteristic to be controlled and being driven by an AC power source. The DC power consuming device requires DC power in excess of DC solid switching component power dissipation capability. AC switching means is connected to the AC power source and provides a controlled AC power output. Rectifying means is connected to receive the controlled AC power output and to provide the high DC power to the DC power consuming device. Controller means is connected to the DC power consuming device for sensing the state of the predetermined characteristic and for providing a controller output indicative thereof. The controller output is connected to said AC switching means, whereby the controlled AC power output is sufficient to provide the required high DC power to maintain the predetermined characteristic in the DC power consuming device.

The invention further relates to a method for providing a low noise high DC power level to a DC load utilizing an AC power source for the purpose of controlling a predetermined DC load characteristic, wherein the DC power level exceeds switching semiconductor DC power dissipation capabilities. The method includes the step of switching the AC power to obtain time proportional AC power and rectifying the time proportional AC power to obtain the high DC power level. Further, the step is included of controlling the step of switching the AC power to maintain the predetermined DC load characteristic.

The invention also relates to a method for providing a high DC power level to a DC load while reducing electrical noise, extending the life of the DC load, and controlling a DC load characteristic. The method includes the steps of connecting an AC voltage from an AC power supply to an AC switch and switching the AC voltage to obtain time proportional AC voltage. The method further includes the steps of transforming the time proportional AC voltage to a lower AC voltage and rectifying the transformed time proportional AC voltage to obtain the high DC power level for the DC load. The method also includes the step of controlling the step of switching the AC voltage to control the DC load characteristic at a predetermined level, whereby load switching noise and load life degradation is minimized.

In yet another aspect of the invention a control system is disclosed for providing low electrical noise semiconductor testing at predetermined temperature using an AC power supply. AC switching means is connected to the AC power supply to provide a time proportional AC power output. Rectifying means is connected to receive the time proportional AC power output and to provide DC power output. At least a 300 watt DC heater is connected to receive the DC power output. A semiconductor test mounting chuck has a semiconductor mounting surface thereon and is thermally connected to the DC heater. Temperature sensing means is positioned proximate to the semiconductor mounting surface to provide temperature indicative output signals and control means is connected to receive the temperature indicative output signals and to provide a control signal output. Switch control means is included in the AC switching means for receiving the control signal output and for controlling the time proportional AC power output to provide a predetermined temperature at the semiconductor mounting surface.

A temperature controllable low electrical noise DC power heated semiconductor test chuck includes a top plate having an exterior semiconductor mounting surface and an opposing interior surface. A depending skirt is formed on the top plate surrounding the opposing interior surface. A dielectric wafer has an upper surface abutting the top plate interior surface and a lower wafer surface. A DC heater blanket is positioned abutting the lower wafer surface on one side and has a lower heater blanket side. Heat reflecting means is in contact with the heater blanket on the lower heater blanket side. Bottom clamping and chuck mounting means is positioned adjacent the heat reflecting means on the side thereof remote from the heater blanket contact, whereby heat is directed toward the semiconductor mounting surface and away from the bottom clamping and chuck mounting means. The semiconductor mounting surface is electrically isolated from the DC heater, is maintained substantially flat over operating temperature range, and is substantially free of radiated electrical noise.

In yet another aspect of the invention apparatus is provided for use with an AC power source for providing DC power on demand to a DC load at a power level above the DC power dissipation capabilities of DC semiconductor switching devices. AC switching means is connected to the AC power source for providing a time proportional AC power output. Rectifying means converts the time proportional AC power output to a DC power output, whereby electrical radiated noise is minimized and high DC power level is delivered from the rectifying means on demand to the DC load due to the lack of DC power switching.

BRIEF DESCRIPTION OF THE DRAWINGS

FIG. 1 is a diagram of a system for providing DC power to a DC load which preceded the present invention.

FIG. 2 is a diagram of a system for providing DC power to a DC load which incorporates the present invention.

FIG. 3 is a diagram of a system for providing DC power to a DC load which includes an active feedback loop.

FIG. 4 is a schematic electrical diagram of a preferred embodiment of the present invention.

FIG. 5 is a diagram of a time proportional AC output having fixed time base.

FIG. 6 is a diagram of a time proportional AC output utilizing variable time base.

FIG. 7 is a diagram of time proportional AC output utilizing phase angle firing.

DESCRIPTION OF THE PREFERRED EMBODIMENT

Figure 8:
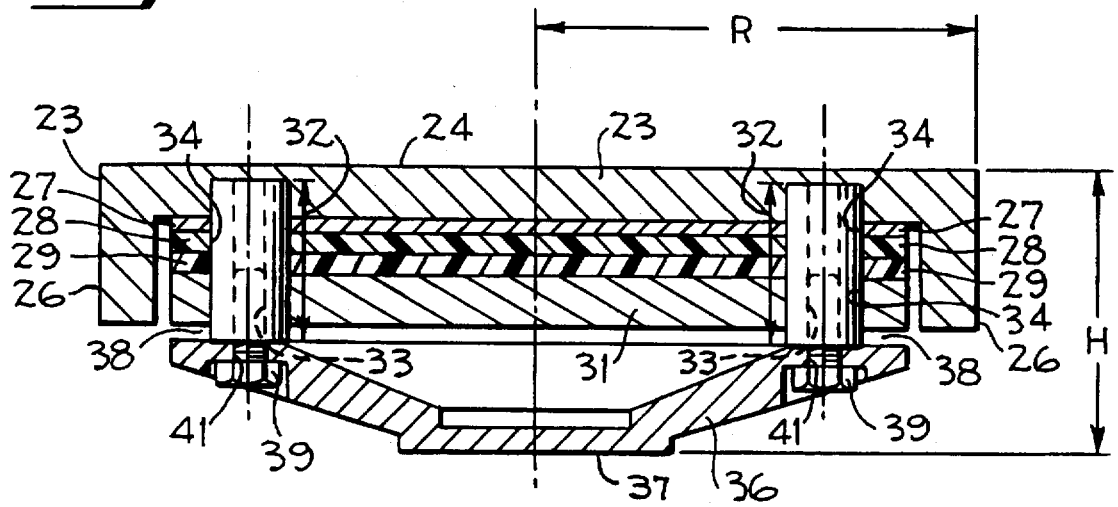
FIG. 8 is a section of a heated semiconductor test chuck which includes the advantages of the present invention.

High AC power has long been available for powering AC devices, but AC power generates radiated noise and also lowers the useful lifetime of devices such as electrical heaters. In the DC area, where radiated noise is minimized and the life of the device to be powered is extended (i.e., an electrical heater), power to be delivered to a load from an AC source is limited due to the power dissipation limitations in semiconductor devices used to proportion the DC power in accordance with load demand. An example of such a power limited DC supply is shown in the old art diagram of FIG. 1. In FIG. 1 AC power 10 is rectified to provide DC power 11 which is then switched in an array of semiconductor devices 12 to proportion the DC power for demand delivery to a DC load 13. The aforementioned power limitations in the semiconductor array 12 which provides the DC switching currently has a power limitation of about 42 volts DC at 7 amperes, for example. This is a commonly observed limitation which attaches to DC power circuits such as that shown in FIG. 1 wherein power to a DC load is limited to a level below 300 watts.

Turning now to FIG. 2, the concept of the present invention is illustrated. The diagram of FIG. 2 shows the AC power source 10 connected to an AC switching circuit 14 rather than the rectifying circuit 11 as in FIG. 1. The AC switching circuit 14 functions as a power control. Power controls with a "time proportioning" output operate to proportion the power to a load with "on" and "off" command signals to the power control. The power control providing the AC switching in the AC switch 14 of FIG. 2 may be a solid state relay (SSR) or a silicone controlled rectifier (SCR) for example. Proportioning is accomplished by turning the power off for a longer proportion of a time period as the DC load 13 of FIG. 2 approaches a predetermined load characteristic. The predetermined load characteristic may be a temperature if the load is an electrical DC heater, or it may be a motor speed if the DC load is a DC electric motor, or it may be a motor torque if the DC load is a DC motor, for example. Power control which provides proportional power should not be confused with mere on/off power control where there is no time proportional aspect to the AC power provided. SSR and SCR devices are solid state switches which are capable of providing power for a cycle time as short as one AC cycle. An AC power source typically alternates plus and minus 60 times per second in the U.S. (50 times per second in Europe). The aforementioned solid state switches can accurately control each AC cycle. One type of power control is termed burst firing. Burst firing provides a proportional power output by turning the AC solid state switch (represented by the AC switch 14 in FIG. 2) "on" for a given number of AC cycles and then turning it "off" for another number of AC cycles. The is proportion of "on" and "off" for the solid state switch is in accordance with the DC power demand by the DC load 13. The load demand is sensed and communicated by a circuit controller 16 to the AC switch 14 in a fashion to be hereinafter described. Alternatively, a constant high power level may be provided from the rectifier 11 to the DC load 13 of FIG. 2 by setting the proportion of "on" and "off" power cycles for the AC switch 14 as a constant.

Prior to proceeding further with the description of the preferred embodiment it should be noted that burst firing to provide time proportional AC power output may be provided in several ways. With reference to FIG. 5 of the drawings a chart is shown showing voltage as a function of time. Presuming the AC voltage wave shown in FIG. 5 is 60 cycle, 60 cycles of AC sine wave voltage are shown occurring in one second of time. If the SSR or SCR (AC switch 14) is controlled by a controller (16) to provide forty percent power, power would be passed by the AC switch 14 forty percent of the time. Therefore, the AC switch would pass the first 24 cycles of sine wave voltage during the one second time period shown in FIG. 5 and would then shut off at 0.4 seconds after $t_0$ and remain off for the ensuing 36 AC cycles. The example of FIG. 5, therefore, shows a fixed time base of 1 second wherein time proportional AC power output is forty percent.

With reference to FIG. 6 of the drawings, burst firing for time proportional AC power output control is available with a variable time base. On and off time at AC switch 14 is proportional to a control signal provided by controller 16, but the time base changes according to the demand for power at the load. Using the example of forty percent power requirement again in FIG. 6, it may be seen that the AC switch 14 is controlled by controller 16 to be on for two sine wave voltage cycles from $t_o$ until $t_1$ and off for three sine wave voltage cycles from time $t_1$ to time $t_2$. The pattern is then repeated with two sine wave voltage cycles being passed during the "on" time, $t_2$ through $t_3$ and the AC switch being shut off to block three cycles from time $t_3$ through time $t_4$. The proportion of time $t_0$ through $t_1$ to time $t_0$ through time $t_2$ is forty percent in the example of FIG. 6.

The AC switch 14 once turned on by controller 16, latches on and only turns off when the polarity of the voltage across the switch changes as dictated by controller 16. If the switch on point is delayed along the AC voltage sine wave by the controller, as seen in FIG. 7, then the amount of power passed through the AC switch can be controlled. FIG. 7 shows the AC switch turn on delay to be 90° along the voltage sine wave so that only one half of each positive and negative going portion of the sine wave is passed by the AC switch 14. In the example of FIG. 7 the time proportional output is 50 percent since one half of the voltage sine wave is passed by the AC switch. This is termed phase angle firing and is a useful method of proportioning power from an AC power supply.

FIG. 3 shows the AC power source 10 connected to an AC proportional power control switch 14 and also to a controller 16. The AC proportional power control switch 14 has the time proportional AC power output thereof connected to the rectifier 11 which provides DC power output to the DC load 13. In the system of FIG. 3 the load 13 has a predetermined load characteristic (i.e., temperature), which is to be maintained by the system of FIG. 3. Sensing means (not shown) to be hereinafter defined by way of example in conjunction with FIG. 4, is coupled to the DC load 13 to sense the state of the predetermined load characteristic and provide a characteristic state output which is connected to the controller 16. The controller 16 provides an output connected to the AC proportional power control switch 14 which provides time proportional AC power output from switch 14 to the rectifier 11 to therefore provide DC power from the rectifier to the DC load as demanded by the load to maintain the predetermined load characteristic. The system of FIG. 3 is seen to provide proportional DC power to the DC load 13 without the need for DC power switching. Therefore, the DC power limitations imposed by the power dissipation capabilities of DC power switches is removed, radiated noise caused by power switching in the DC supply is substantially nonexistent, and adjustable proportional DC power is provided in DC load high current or voltage demand situations.

With reference now to FIG. 4 of the drawings, an example of a control system for a high DC power consuming device having a predetermined characteristic to be controlled is shown. The circuit is connected to an AC power source and the DC power consuming device 22 is an electrical DC heater in the example hereinafter described in conjunction with FIG. 4, the heater requiring DC power in excess of DC solid state switching component power dissipation capabilities. It should be noted that the DC power consuming device 22 of FIG. 4 may be a DC motor and the signals FB motor torque feedback signals, or the device may be a DC motor and the signals FB motor speed feeback signals. These embodiments represent exemplary uses of the present invention as mentioned in conjunction with the description of FIG. 3 and the DC load 13 described therein. The circuit of FIG. 4 has a fuse F for circuit protection at the AC power input. A power switch S1 is shown for providing "on" and "off" control for the circuit of FIG. 4. When switch S1 is in the "on" position, a relay actuated switch S2 having an AC actuating coil 17 is closed. Conversely when the switch S1 is opened power is interrupted from the coil 17 and switch S2 is moved to an "off" position, thereby coupling a capacitor bank C and a drain resistor R to ground as shown. This is a safety feature to drain voltage off of the capacitor bank C when the circuit of FIG. 4 is shut down after having been energized. Capacitor bank C is typically 34,000 micro farads in this embodiment and is present for DC smoothing purposes, as will be hereinafter explained. It may be seen that a considerable charge may be built up on the capacitor bank which may be dangerous or at least uncomfortable if contacted by a person after the circuit of FIG. 4 has been in operation.

The AC switch 14 of FIG. 4 is positioned in the line from the AC power source to which the circuit of FIG. 4 is connected. The AC switch 14 provides time proportional AC power output as hereinbefore described to a step down voltage transformer 18. The AC switch 14 in the circuit of FIG. 4 is exemplified by solid state relay power control part number V-01-240-25-AT provided by Watlow Controls, Winona, Minn. The aforementioned Watlow AC switch was controlled to provide phase angle firing in the embodiment of FIG. 4 to obtain the time proportional AC power output. The AC switch 14 also has a stepped down AC voltage provided by a transformer 19, which stepped down signal is used by the AC switch to turn power "on" and "off" at any point in the AC cycle.

The time proportioned AC power output is stepped down in voltage at the transformer 18 and connected to the bridge rectifier 21 which provides proportional DC power therefrom with a voltage ripple thereon. The capacitor bank C smoothes the proportional DC ripple and the proportional DC power is connected to an electrical heater load 22 in one example of FIG. 4. The resistor R is 470 ohms in this embodiment and operates (as mentioned before) as a drain resistor for removing the charge from capacitor bank C when switch S2 is moved to the "off" position when the circuit is de-energized by opening switch S1. Temperature sensors in this example are coupled to the DC heater load 22 which produce temperature indicative signals connected through a group of conductors FB to the controller 16. Alternatively as mentioned hereinbefore, the temperature sensors may be replaced by a motor speed sensor or a motor torque sensor if the load is an electrical motor and the predetermined load characteristic is motor speed or motor torque respectively. Controller 16 is also connected to the AC power source when the circuit of FIG. 4 is energized by closing switch S1.

In summary, the circuit of FIG. 4 functions to provide time proportioned AC power output to transformer 18 when switch S1 is moved to the on position. Transformer 18 steps down the AC voltage and connects the time proportioned AC power output to the rectifier bridge 21 for providing proportional DC power output having a ripple imposed thereupon. The capacitor bank C smoothes the ripple from the DC power output of rectifier 21 and couples the proportional DC power to the DC heater load 22. In the example of FIG. 4, temperature is the predetermined load characteristic which is controlled. Temperature sensors provide temperature indicative signals which are fed back through signal conductors FB to the controller 16. The controller 16 provides output control signals in accordance with the temperature feed back signals which control the AC switch 14 to provide time proportional AC output sufficient to deliver proportional DC power as required by the heater load 22 to maintain a predetermined heater temperature.

The controller 16 in the embodiment of FIG. 4 is exemplified by the Watlow model number 989B-22FF-KRRG obtained from Watlow Controls, Winona, Minn. which may control AC switch 14 in either phase angle or burst firing mode. The circuit of FIG. 4 provides 42 volts DC at 10 amperes which amounts to 420 watts DC power. This is considerably in excess of the power output capabilities of DC power supplies represented by the old art of FIG. 1. Moreover, the heater load 22 life is extended by the absence of DC power switching and radiated electrical noise is effectively eliminated for the same reason. The circuit of FIG. 4 further exemplifies a circuit which provides DC proportional power of 36 volts DC at 50 amperes for a high power DC electrical heater load. This may be seen to amount to 1800 watts of DC power which is also clearly superior to the power capabilities of the old art of FIG. 1 as well as being conducive to extended heater life and radiated electrical noise elimination.

While the circuit of FIG. 4 is described in terms of controlling temperature at a DC powered electrical heater, the electrical load therein may be any other DC load requiring relatively high DC power. The DC load charcteristic at DC load 22 may be a DC motor speed to be controlled wherein the feedback signal FB to controller 16 is a motor speed signal. In like fashion, the DC load may be a DC motor and the predetermined load characteristic may be motor torque. Motor shaft output torque signal would then constitute the feedback signal FB to the controller 16. Any number of predetermined load characteristics as well as temperature, motor speed or torque may effectively be controlled by the circuit of FIG. 4 represented by the block diagram of FIG. 3.

With reference now to FIG. 8 of the drawings a dimensionally stable temperature controllable low electric noise DC power heated semiconductor test chuck is shown in section. The as component parts of the semiconductor test chuck constituting the preferred embodiment are substantially circular in plan view. The chuck of FIG. 8 has the usual air channels (not shown) therein for applying vacuum at the chuck surface to secure semiconductor elements to be tested thereon. Such features of the test chuck not being a part of the invention, they will not be described further herein. The purpose of the heated semiconductor test chuck is to look at semiconductor circuit behavior at various temperatures in an electrically isolated low radiated noise environment. Such testing is useful in research and development, semiconductor circuit failure analysis and production testing prior to packaging of semiconductor circuits.

The heated semiconductor test chuck of FIG. 8 has a top plate 23 having an upper semiconductor mounting surface 24 thereon and a depending skirt 26 extending around the periphery thereof. A dielectric wafer 27 such as a silicon wafer is disposed adjacent to the undersurface of the top plate 23. A heater blanket 28 is disposed beneath the dielectric wafer 27, representing the DC power consuming heater load 22 of FIG. 4. A heat reflector 29, such as flame thermal paper, is situated adjacent to and beneath the heater blanket 28 so that heat is reflected toward the semiconductor mounting surface 24.

The remainder of the components in the heated semiconductor test chuck of FIG. 8 provide for securing the sandwiched top plate, dielectric wafer, heater blanket and heat reflector together and to provide a mounting base for the chuck. A bottom clamp plate 31 is situated adjacent to and below the heat reflector 29. A plurality of of high dielectric low temperature coefficient standoffs 32 are secured within bores in the undersurface of the top plate 23, wherein the bores extend to a position proximate to the semiconductor mounting surface 24. Typically, the bores and therefore the standoffs 32 extend to within about 0.050 inches of the mounting surface 24. The standoffs 32 may be of a ceramic material and have threaded holes 33 extending therethrough. Each of the dielectric disc 27, heater blanket 28, heat reflector 29 and bottom clamping plate 31 have a plurality of holes 34 in alignment therethrough which allow a plurality of standoffs 32 to pass through this sandwiched assembly. A base mounting flange 36 has a bottom mounting surface 37 thereon. The standoffs 32 have sufficient length, as shown, to create a gap 38 between the base mounting flange 36 and the bottom clamp plate 31. The standoffs 32 and the air gap 38 serve to prevent migration of heat toward the mounting surface 37. The air gap 38 also provides a space into which the chuck assembly components surrounding the standoffs 32 may expand when heated. Fasteners 39 are placed through holes 41 in the base mounting flange to engage the internal threads in the threaded holes 33 of the standoffs 32.

Figure 10:
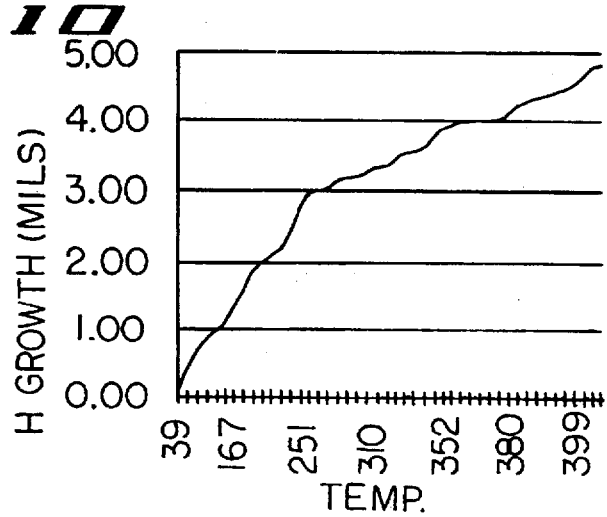
FIG. 10 shows the growth of the height dimension as a function of temperature in the semiconductor test chuck of FIG. 8 incorporating the present invention.

The depending skirt 26 is formed on the top plate 23 to reduce warping of the mounting surface 24 during heating of the mounting surface 24. It may also be seen that the standoffs 32 are positioned at least two-thirds to three-quarters of the radius of the top plate 23 from the center thereof to minimize temperature induced tilt of the surface 24 due to uneven growth or contraction of the standoffs 32. The height H of the heated semiconductor test chuck from the semiconductor mounting surface 24 to the chuck mounting surface 37 is ideally constant to facilitate accurate probing and testing of a semiconductor circuit mounted on the surface 24. It may be seen that tilting or vertical displacement of the surface 24 will cause misalignment between circuit test pads and test probes due to changing registration of the test probe pattern and the semiconductor circuit test pad pattern. With the arrangement of FIG. 8, the only change in the dimension H of FIG. 8 due to temperature expansion and contraction is over the distance between the end of the standoffs 32 and the mounting surface 24 which, as hereinbefore described, is kept to about 0.050 inches. Some contribution to the change in dimension H is due to temperature expansion or contraction in the vertical dimension of the base mounting flange 36, but the base mounting flange is thermally isolated from the heater 28. The majority of the expansion of the assembly of the components surrounding the standoffs 32 occurs within the air gap 38. Therefore, the bulk of the change in the dimension H is due to the aforementioned change in the 0.050 inch dimension. FIG. 10 shows growth in the dimension H of FIG. 8, wherein the growth is shown in thousandths of an inch on the ordinate and the temperature in degrees Celsius is shown on the abscissa. It may be seen that over a temperature change of approximately 40° to 400° Celsius that less than a five thousandths of an inch growth in the height dimension H is experienced.

Figure 9:
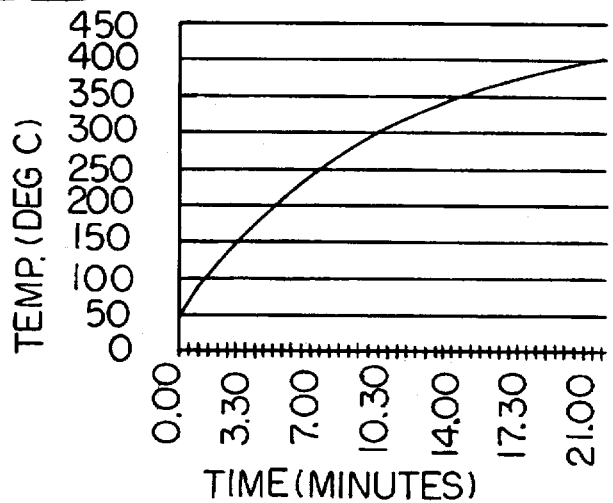
FIG. 9 is a chart showing temperature as a function of time in the semiconductor test chuck of FIG. 8.

The heated semiconductor test chuck of FIG. 8 when included as the electrical heater 22 of FIG. 4, exhibits the temperature rise as a function of time depicted in the chart of FIG. 9. It takes about 21 minutes for the semiconductor mounting surface 24 to change from approximately 50° C. temperature to approximately 400° C. temperature in the system depicted by FIG. 4. The wide temperature range of FIG. 9 producing only the small growth shown in FIG. 10 of the dimension H illustrates to the thermal isolation of the base mounting flange 36 from the heater blanket 28. Moreover, electrical isolation of the heater blanket 28 from the semiconductor mounting surface 24 is achieved by the silicon layer forming the dielectric wafer 27. Greater electrical isolation may be obtained if the dielectric wafer constitutes a silicon layer having a diamond layer deposited thereon. A low noise, electrically isolated, thermally controlled DC power heated semiconductor test chuck is therefore provided which experiences extremely small semiconductor mounting surface displacement and/or distortion over wide test temperature ranges at the upper semiconductor mounting surface 24.

Although the best mode contemplated for carrying out the present invention has been herein shown and described, it will be apparent that modification and variation may be made without departing from what is regarded to be the subject matter of the invention.

What is claimed is:

1. A control system for low electrical noise semiconductor testing at predetermined temperature using an AC power supply, comprising AC switching means controllable between and "off" nonconducting state and an "on" conducting state, said switching means being connected to the AC power supply and providing a time proportional AC power output during said "on" conducting state, rectifying means connected to receive said time proportional AC power output and providing DC power output, at least at 300 watt DC heater connected to receive said DC power output, semiconductor test mounting chuck having a semiconductor mounting surface thereon and being thermally connected to said DC heater, temperature sensing means positioned proximate to said semiconductor mounting surface for providing a temperature indicative output signal, control means for receiving said temperature indicative output signal and providing a control signal output, and switch control means within said AC switching means for receiving said control signal output and controlling said time proportional AC power output to provide the predetermined temperature at said semiconductor mounting surface.

2. A control system as in claim 1 wherein said semiconductor test mounting chuck comprises a top plate having said semiconductor mounting surface on the upper surface thereof and having a lower surface, a depending skirt on the periphery of said top plate, a semiconductor wafer having an upper surface abutting said top plate lower surface and having a lower wafer surface, said 300 watt DC heater comprising a heater blanket abutting said lower wafer surface, bottom clamping means for holding said top plate, semiconductor wafer and heater blanket in sandwiched relation, and thermal reflection means interposed between said heater blanket and said bottom clamping means, whereby heat is directed toward and electrical isolation is provided for said semiconductor mounting surface.

3. A control system as in claim 2 wherein said bottom clamping means comprises, a plurality of high dielectric low temperature coefficient standoffs connected to said top plate and extending therewithin to a position proximate to said semiconductor mounting surface, a bottom clamping plate abutting said thermal reflection means, a base mounting flange, spacer means between said bottom clamping plate and said base mounting flange, whereby an air gap is created therebetween, said semiconductor wafer, heater blanket, thermal reflection means, and bottom clamping plate having a plurality of aligned openings therein for allowing said plurality of standoffs to pass therethrough, and fastening means for engaging said plurality of standoffs and said base mounting flange, whereby said semiconductor test mounting chuck is secured together.

4. A temperature controllable low electrical noise DC power heated semiconductor test chuck, comprising a top plate having an exterior semiconductor mounting surface and an opposing interior surface, a depending skirt on said top plate surrounding said opposing interior surface, a dielectric wafer having an upper surface abutting said top plate interior surface and a lower wafer surface, a DC heater blanket abutting said lower wafer surface on one side and having a lower heater blanket side, heat reflecting means in contact with said DC heater blanket on said lower heater blanket side, bottom clamping and chuck mounting means adjacent said heat reflecting means on the side thereof remote from said DC heater blanket contact, whereby heat from said DC heater blanket is directed toward said semiconductor mounting surface and away from said bottom clamping and chuck mounting means, and whereby said semiconductor mounting surface is electrically isolated from said DC heater blanket, is maintained substantially flat over operating temperature range, and is substantially free of radiated electrical noise.

5. A semiconductor test chuck as in claim 4 wherein said dielectric wafer comprises a semiconductor wafer.

6. A semiconductor test chuck as in claim 4 wherein said dielectric wafer comprises a silicon wafer and a diamond layer on said silicon wafer.

7. A semiconductor test chuck as in claim 4 wherein said heat reflecting means comprises flame thermal paper.

8. A semiconductor test chuck as in claim 4, comprising a plurality of high dielectric low temperature coefficient standoffs connected to said top plate and extending therethrough to a position proximate to said exterior semiconductor mounting surface, and means for connecting said bottom clamping and chuck mounting means to said plurality of standoffs, said dielectric wafer, DC heater blanket and heat reflecting means having a plurality of aligned openings therein for allowing said plurality of standoffs to pass therethrough.

9. A semiconductor test chuck as in claim 4 wherein said DC heater blanket comprises at least a 300 watt heater.

10. A semiconductor test chuck as in claim 4 comprising temperature sensing means positioned proximate to said exterior semiconductor mounting surface.

11. A method for controlling temperature level and reducing radiated electrical noise levels during semiconductor component testing, wherein AC power is supplied, comprising the steps of switching the AC power to provide time proportional AC power output to obtain time proportional DC power output, providing at least 300 watts of the DC power output to a DC heater, thermally connecting said DC heater to a semiconductor component mounting surface, continuously sensing the temperature of the semiconductor component mounting surface, providing a temperature indicative output signal from the continuous sensing, and continuously controlling the time proportional AC power output to provide a predetermined temperature level at the semiconductor mounting surface.

12. The method of claim 11 wherein the semiconductor mounting surface and the DC heater are arrayed in layered relationship with an underlying support structure, further comprising the steps of interposing a thermal reflecting layer between the underlying support structure and the DC heater.

13. The method claim 12 further comprising the steps of extending a plurality of high dielectric low temperature coefficient members from attached at one end to a position adjacent the semiconductor component mounting surface through the layered DC heater and thermal reflecting layer, and attaching the other end of the plurality of high dielectric low temperature coefficient members to the underlying support structure.

* * * * *